(12) United States Patent
Russo et al.

(10) Patent No.: US 7,430,400 B2
(45) Date of Patent: Sep. 30, 2008

(54) WIFI COLLABORATION METHOD TO REDUCE RF INTERFERENCE WITH WIRELESS ADAPTER

(75) Inventors: David W. Russo, Woodinville, WA (US); Wui Guo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/091,557

(22) Filed: Mar. 28, 2005

(65) Prior Publication Data

US 2006/0217071 A1  Sep. 28, 2006

(51) Int. Cl.
*H04B 7/00* (2006.01)
*H04B 1/00* (2006.01)
*H04B 15/00* (2006.01)
*H04M 1/00* (2006.01)

(52) U.S. Cl. ............... 455/66.1; 455/552.1; 455/63.3; 375/132

(58) Field of Classification Search ............ 455/78, 455/63.1, 63.3, 552.1, 67.13, 66.1, 526, 71, 455/105, 447, 60, 464; 375/132, 133, 134, 375/135, 136, 137
See application file for complete search history.

(56) References Cited

U.S. PATENT DOCUMENTS

| | | | |
|---|---|---|---|
| 6,684,062 B1 | 1/2004 | Gosior et al. | ............... 455/73 |
| 7,295,528 B2 * | 11/2007 | Ibrahim et al. | ............ 370/310 |
| 2004/0111755 A1 | 6/2004 | Perlman | .................. 725/133 |
| 2004/0242159 A1 * | 12/2004 | Calderon et al. | ........ 455/63.3 |

FOREIGN PATENT DOCUMENTS

EP  1 119 137  7/2001

* cited by examiner

*Primary Examiner*—Matthew Anderson
*Assistant Examiner*—Eugene Yun
(74) *Attorney, Agent, or Firm*—Woodcock Washburn LLP

(57) ABSTRACT

A system and method for preventing a wireless controller system and WiFi radio system within a console from interfering with each other. The WiFi system is prevented from activating its transmitter during the controller receive times by detecting a signal sent to the WiFi module indicating where the controller receive times occur. Based upon the state of the signal, the WiFi transmission algorithm can determine the appropriate times to turn on and off the WiFi transmitter in concert with the defined 802.11 media access protocol. Furthermore, the WiFi module provides its operating channel information to the controller radio system to avoid using the WiFi channel for any communications.

7 Claims, 8 Drawing Sheets

WIFI COLLABORATION METHOD TO REDUCE RF INTERFERENCE WITH WIRELESS ADAPTER

FIELD OF THE INVENTION

This invention generally relates to the field of gaming and multimedia devices. In particular, the present invention is directed to a method of reducing RF interference between a wireless network radio and a wireless adapter in the device.

BACKGROUND OF THE INVENTION

In gaming systems or other devices having two different wireless radio sub-systems there is a possibility that interference may exist between the two sub-systems. This is a problem, for example, if each radio system operates autonomously and uses the 2.4 GHz (or other) band to operate. To prevent this from occurring, some type of spectrum sharing between these two radio sub-systems is required. Simple avoidance by using different parts of the spectrum is not sufficient because power levels of the first transmitter may affect the second receiver regardless of the specific portion of the spectrum it is operating. The problem is worse if RF channels within the band overlap. As such, conventional solutions have been costly or have failed to acceptably reduce the interference problem.

Thus, there is a need for a system and method for reducing the interference between two radio subsystems operating in the same band. There is also a need for the system to be cost efficient and effective. The present invention provides such a solution.

SUMMARY OF THE INVENTION

The present invention is directed to a gaming console that includes a memory, a microprocessor, a first radio subsystem that communicates to a network infrastructure, and a second radio subsystem that communicates to a wireless accessory. When the second radio subsystem communicates to the wireless accessory, transmissions from the first radio subsystem are delayed so as to not interfere with the second radio subsystem.

In accordance with a feature of the invention, a signaling path is provided between the first radio subsystem and the second radio subsystem. In addition, a software communications channel may be provided between the first radio subsystem and the second radio subsystem to communicate information between the first radio subsystem and the second radio subsystem. The information may include details about an RF channel in use, collaboration on/off, or retransmission on/off. Also, the information may include the specifics of wireless accessory connections, timeslots in use, overlapping channels, when the second radio subsystem is going to use channels of the first radio subsystem, or a channel the first radio subsystem should not use.

In accordance with another feature, a collaboration signal may be asserted if the second radio subsystem is to communicate on a frequency that overlaps with the first radio subsystem. The collaboration signal informs the first radio subsystem that it is not to transmit because doing so may cause interference with the second radio subsystem. The collaboration signal may be asserted a predetermined period of time before the first radio subsystem is to delay transmissions. The collaboration signal may be asserted in accordance timeslots within a protocol of the second radio subsystem.

In accordance with another aspect of the invention, there is provided a method of collaboration between a first radio subsystem and a second radio subsystem in a gaming console. The method includes providing a signaling path between the first radio subsystem and the second radio subsystem; asserting a collaboration signal along the signaling path when the second radio subsystem communicates with a wireless accessory; and delaying transmissions of the first radio subsystem when the collaboration signal is asserted.

In accordance with yet another feature of the invention, there is provided a method of collaboration between a WiFi radio and an Adaptive Frequency Hopping (AFH) radio that share frequency spectrum. The method includes providing a signaling path between the WiFi radio and the AFH radio; providing first information to the WiFi radio about frequency spectrum use by the AFH radio; providing second information to the AFH radio about a channel in use by the WiFi radio; asserting a collaboration signal along the signaling path when the AFH radio communicates with a wireless accessory; and delaying transmissions of the WiFi radio when the collaboration signal is asserted.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
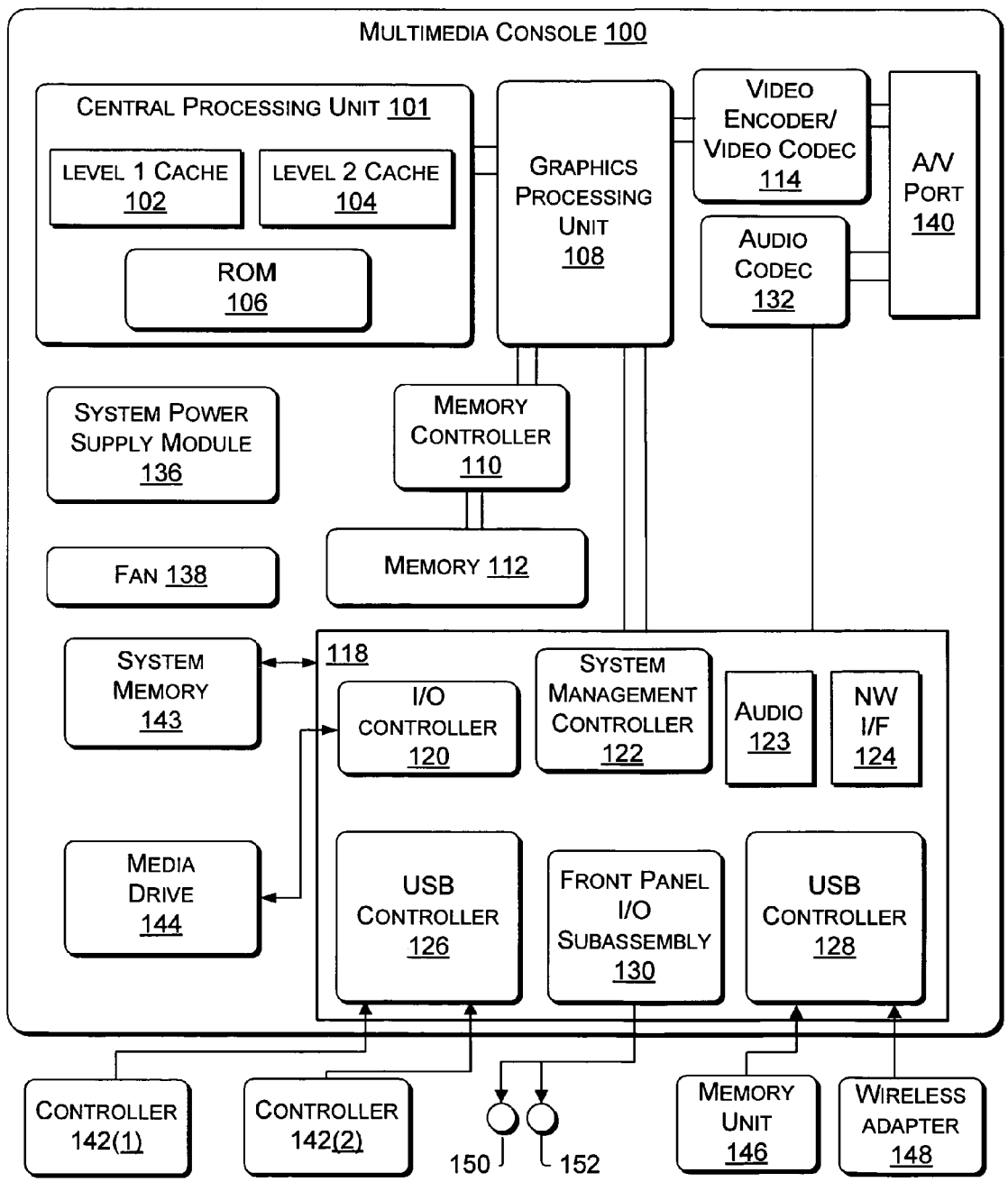
FIG. 1 is a block diagram showing a gaming console in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104.

The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitates processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 2:
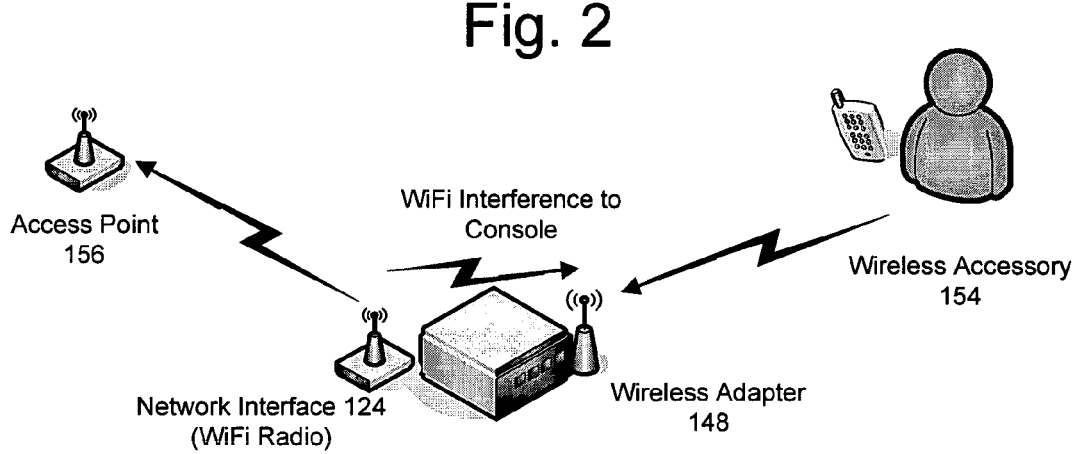
FIG. 2 illustrates the console of FIG. 1 having two different radio sub-systems.

Referring to FIG. 2, the console 100 may be configured having two different radio subsystems. The first wireless system is an 802.11b/g standard compliant module (WiFi) within the network interface 124, which is used for wireless home network connectivity via an access point 156. This can be used in place of a standard Ethernet connection to add wireless networking ability to access the Internet or remote PC's. The second is a frequency-hopping, low transmit power system within the wireless adapter 148 for wireless connectivity of various peripherals (e.g., a wireless accessory 154) which can be used to operate the games.

Here, both radios operate in the Industrial-Scientific-Medical (ISM) 2.4 GHz band and each radio has the potential to create RF interference into the other's operation. Because of this, the present invention advantageously provides a coordination activity between them which allow these radios to share the same spectrum in order to reduce RF interference between the two radio sub-systems. The interference problem is most problematic when: (1) the WiFi radio in the network interface 124 is transmitting and the wireless adapter 148 is receiving, regardless of RF channel used in the ISM band, and (2) the transmitter in the wireless adapter 148 is transmitting on an overlapping RF channel with the WiFi radio.

The reason the first case is a problem is because of a combination of two factors: the absolute transmit power of the WiFi transmitter (up to +20 dBm), and the out-of-band rejection capability of the wireless adapter 148. When these two items are combined, there is a significant amount of de-sensitivity occurring within the wireless adapter 148. The receiver sensitivity drops because of this interference. This has a significant effect on the overall distance the wireless accessory 154 can be located away from the console 100. In other words, it will diminish the region of RF coverage. It will also impact the battery life of the wireless accessory 154 because of the need for extra transmit power levels necessary to maintain the RF signal quality.

In the second case, when the radio in the wireless adapter 148 is transmitting on an RF channel that overlaps those being used by the WiFi radio in the network interface 124, it will de-sensitize the WiFi radio receiver. Further, if the WiFi radio is transmitting, the wireless adapter receiver signal strength will be too small relative to the WiFi transmitter and the wireless adapter communications channel (i.e., 148->154) will not operate.

To resolve the problem when the WiFi radio is transmitting, the present invention delays the WiFi network transmissions away from the critical receive times of the radio in the wireless adapter 148. Since the WiFi network is packet based, there may be some increase in data packet latency, however, this should be small.

There are certain timing constraints the WiFi device must support. When the WiFi device receives a packet, it must acknowledge the receipt of the packet with an ACK packet. This must start transmission immediately after the SIFS timing period (e.g., 10 usec). The transmission time of the ACK varies from 34 usec to 50 usec, depending on link data rates. If the ACK is not sent then the original packet is retransmitted. When this occurs, there is a significant impact on the WiFi network performance. The present invention accounts for this by allowing the WiFi radio to ignore the collaboration request and transmit the ACK packet.

There are concerns if the WiFi radio is in the middle of transmitting a packet when the collaboration request is made. Depending upon how much of the packet remains before the receive window opens and the rate of transmission, a packet may be aborted. However it will depend upon the exact implementation of the WiFi solution. The WiFi protocol is friendly to a premature packet termination since packet corruption common occurrence from the RF channel. The system will simply retransmit the packet at a later time. A packet should not be repetitively aborted since there are limits to the number of times the WiFi protocol will attempt to retransmit a packet before giving up on the wireless link. This will also impact the rate adaptation algorithm. The Access Point 156 would likely interpret these error events as problems with the RF channel and drop the transmission rate of the link. This has the impact of reducing data throughput and also causes more interference because the WiFi packets will now be longer and consume more time.

There are times the wireless adapter 148 needs to use a channel that overlaps the WiFi channel (i.e., link 124->156). As above, if the WiFi radio in the network interface 124 transmits, the wireless accessory radio link (148->154) will not function in either the transmit or receive state. In this situation the WiFi transmitter is held off from activating during the receive and transmit times of the wireless accessory 154.

When the wireless adapter 148 transmits on an overlapping channel, it has the same effect on the WiFi receiver in the network interface 124. In this case, there is nothing which can be done to prevent the situation. The WiFi radio must operate with the interference. In this instance, the WiFi radio understands the source of the interference and may avoid receiving data packets during those critical periods.

Since the WiFi transmitter will be suspended during reasonability significant portions of time, there will be potential impacts to the amount of throughput which can be achieved by the WiFi radio. If the WiFi radio is attempting to stream data in the uplink direction (i.e., the transmitter is very active), the throughput would drop significantly. Because the two radio networks are sharing the same spectrum and each has the ability to impact the performance of the other, the present invention has given priority to the wireless accessory radio link.

Figure 3:
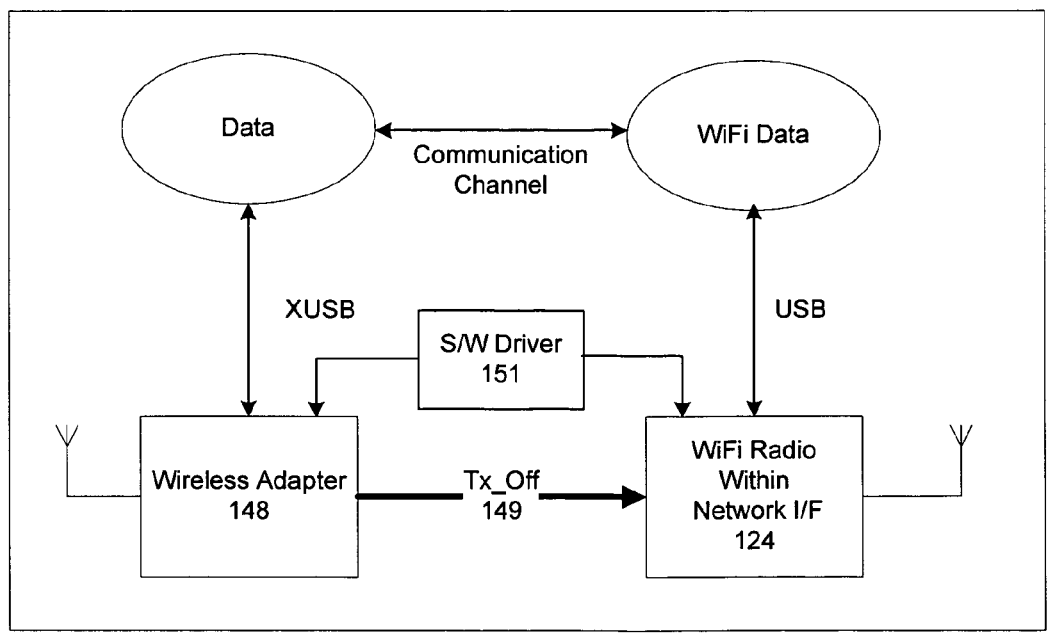
FIG. 3 is a block diagram of the collaboration of the present invention.

FIG. 3 provides a high level block diagram of the collaboration solution. The decision logic which functions within the wireless adapter 148 informs the WiFi radio within the network interface 124 of critical time periods when its receiver is operating. There are three operational states for the radio within the wireless adapter 148: idle, receive, and transmit. Other situations are just a subset of these. From the RF interference view, the receive times are of concern and the system cannot tolerate the WiFi transmitter in the network interface 124 being active during those periods. The transmit times are only of concern when the RF channel being used overlaps that of the WiFi RF channel. The idle times are not of a concern.

In accordance with the present invention, the following exemplary priority rule may be implemented: the wireless adapter 148 packets have priority over WiFi packets transmitted via the network interface 124.

The collaboration solution of the present invention consists of various parts. Generally, it can be broken down into the following: (1) decision logic within the Wireless adapter 148, (2) decision logic within the WiFi network interface 124, (3) a real time collaboration signaling path 149 from the wireless adapter 148 to the WiFi radio in the network interface 124, and (4) a software driver communications path 151 between the wireless adapter 148 and the WiFi radio in the network interface 124.

The collaboration signaling path 149 from the wireless adapter 148 to the WiFi radio in the network interface 124 may be a separate signaling line provided in a USB connector interface to the USB controller 128 or another method. This path provides communications to the WiFi radio whenever the wireless adapter 148 requires that the WiFi radio in the network interface 124 suspend transmission activities because the wireless adapter 148 needs to utilize the RF channel. The collaboration signaling path 149 is labeled, Tx_Off. When Tx_Off is active, it is a request for the WiFi transmitter in the network interface 124 not to be in an active transmitting state (e.g., the output power is <−20 dBm). When the Tx_Off signal is inactive, the WiFi transmitter in the network interface 124 is free to turn on, if required.

The software communications path 151 between the wireless adapter 148 and the WiFi radio in the network interface 124 is also used to permit the sharing of information between the two radio systems, which facilitates more intelligent decisions about the use of the shared spectrum. This information stream may be viewed as a low speed path. This is provided for two reasons. First, to reduce the software load on the console 100. which is responsible for transporting the information exchange. Second, the amount of information is limited to configuration information about the specifics of the two radio systems. The information exchanged consists of the following between the WiFi radio to wireless adapter: WiFi RF channel in use, collaboration On/Off and retransmission On/Off. From the wireless adapter to WiFi radio, the following is exchanged: wireless accessory configuration connections, which timeslots are in active use, overlapping channels, when the wireless adapter is going to be using the WiFi channel for transmit activities, and a WiFi channel the wireless adapter radio is avoiding.

Figure 4:
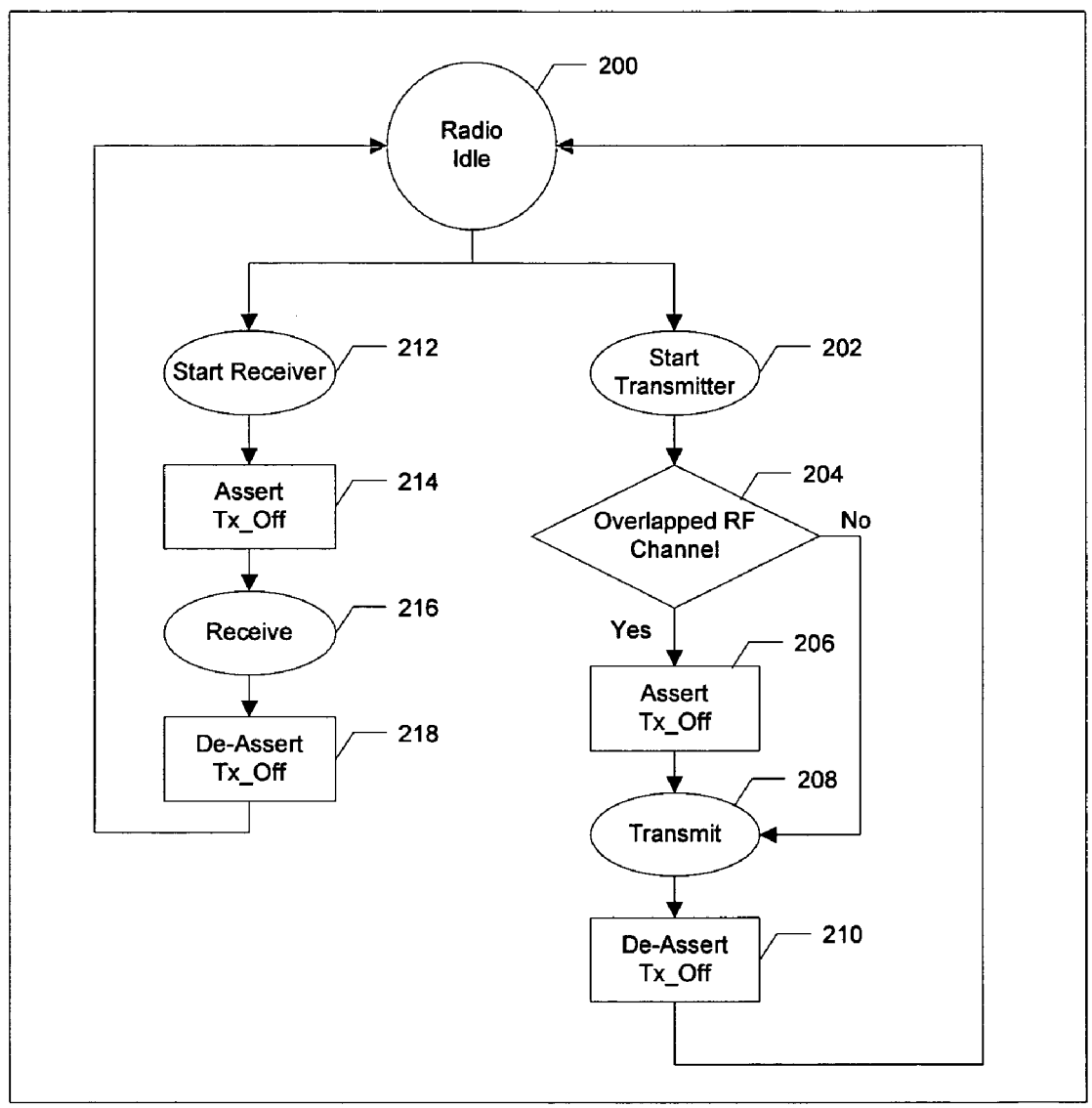
FIG. 4 illustrates a state diagram of the wireless adapter decision logic.

FIG. 4 shows the State Diagram of the wireless adapter decision logic at a high level. Normally, the wireless adapter 148 will not suspend the WiFi transmissions when it is transmitting (see, e.g., steps 202 and 208). However, in the situations where it is necessary to utilize the overlapping channels, the wireless adapter 148 will assert the collaboration signal 149 in those cases (see, e.g., steps 204 and 206). The wireless adapter 148 will be provided the WiFi channel number which is being used on that network. The wireless adapter 148 determines when a potential overlap occurs. It is noted that because of the operating frequency differences when the wireless adapter is operating in an 802.11a mode, the collaboration signal 149 is ignored.

Figure 5:
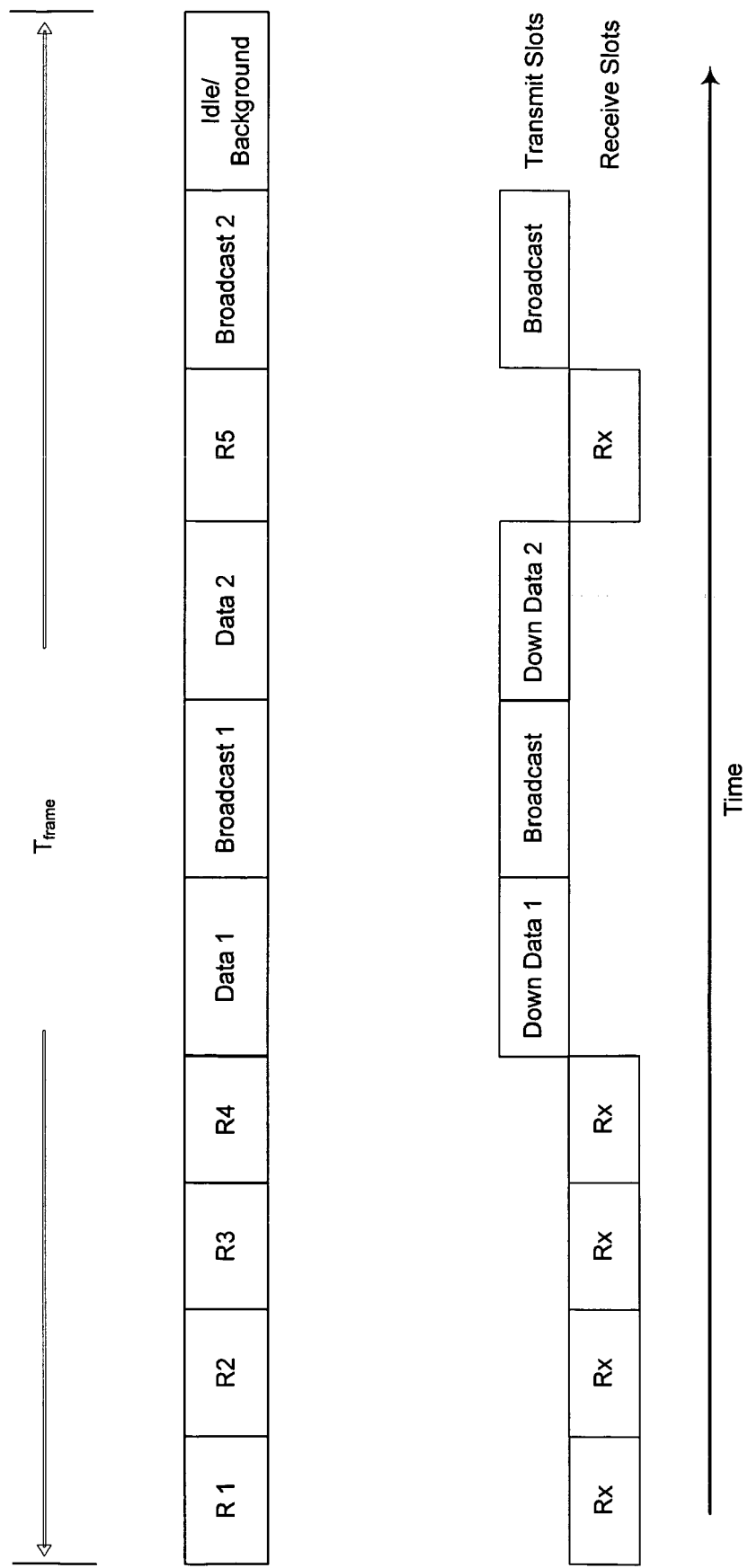
FIG. 5 is a general framework of a wireless accessory communication protocol.

The details of the collaboration signal (Tx_Off) will now be discussed. The general framework of a wireless accessory protocol is shown in FIG. 5. As can be seen, it is a Time Division Multiple Access (TDMA) format. In general, each attached wireless device is assigned to a fixed time slot. That time slot is used exclusively by only that device. Since the radios are a half-duplex device, the same RF frequency is time shared between receive and transmit functions.

The general principle of operation is to inform the WiFi radio in the network interface 124 whenever critical receive times (R1 to R5) occur on the wireless adapter radio link (148->154). This is dependant upon which devices are active on the link. For example, some systems will only be operating with one wireless accessory 154 and only the R1 slot is used. In that case, the system will not need to receive most of the time and the WiFi radio will have access to most of the spectrum. The collaboration logic of the present invention tracks which time slots are in active use and which are not. This state information is made available to the WiFi radio to permit fair-sharing. For each active wireless accessory 154, the collaboration signal 149 is active during its corresponding receive time slot.

The following information may be used to construct an algorithm for determining transmissions by the network interface 124. The network interface 124 knows a-priori the state TX_OFF will be when it is scheduling a transmission. Accordingly, the following information should be considered:

(1) If the WiFi media access contention cycle has completed and the network interface 124 has a packet to transport on the uplink, the network interface 124 may select the next available 802.11 time slot that does not overlap a TX_OFF active time period. If, after the DIFS (DCF Interframe Space) period the channel is still clear, the network interface 124 then transports the packet.

(2) If another WiFi device has taken the channel, then network interface 124 will defer and follow its contention rules.

(3) The network interface 124 does not intentionally transmit a packet when the WiFi system indicates the channel is busy; either from CCA (Clear Channel Assessment) or NAV (Network Allocation Vector) values.

Figure 6:
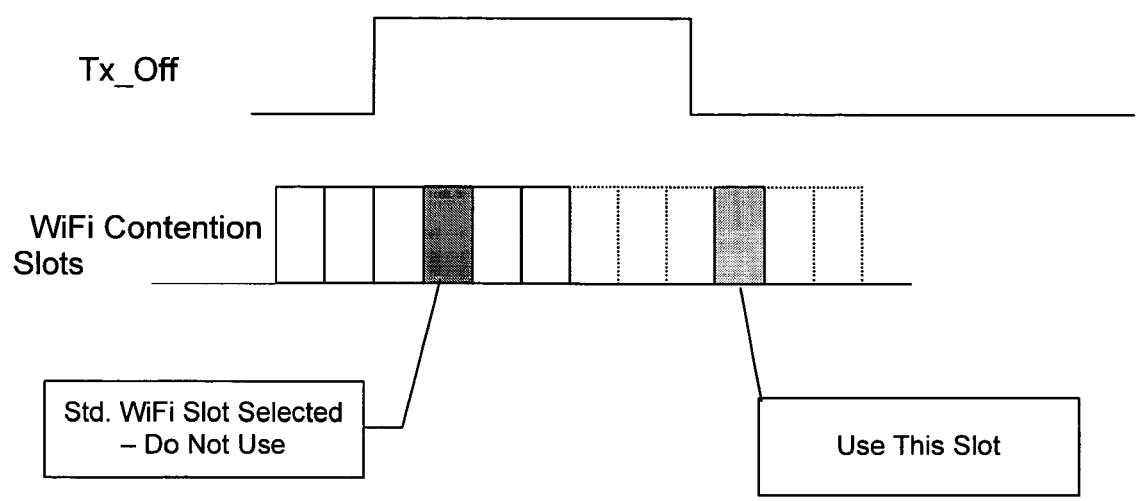
FIG. 6 illustrates timing information wherein a network interface defers to a next available contention widow (CW) slot based on the assertion of a collaboration signal.

(4) If the network interface 124 is executing the WiFi contention algorithm, it preferably observes these requirements:

(a) If the calculated CW (Contention Window) slot overlaps the TX_OFF, the network interface 124 defers until the next available CW slot which does not overlap TX_OFF, as shown in FIG. 6.

(b) Upon a transmit packet failure (ACK packet not received), CWmin does not change for the network interface 124.

(c) ACK and CTS packets ignore the TX_OFF signal.

The Tx_Off 149, provides a warning period (see, FIG. 7) where it gives an in-progress transmit packet a change to complete. The warning period may be between 30 and 500 usec. If the packet is in the middle of being transmitted, the WiFi module in the network interface 124 will attempt to complete the transmission within the warning period. This is dependant upon the amount of the packet that remains and the rate the packet is being transmitted. Otherwise, the WiFi module aborts the transmission at the end of the warning period. Network interface 124 packets that are aborted because of the collaboration signal should not be counted as a retry event in the 802.11 protocol.

There will be occurrences where wireless adapter 148 needs to disable network interface 124 transmissions during other slots times for individual frames. When these events occur, the TX_OFF signal will indicate the request. The network interface 124 transmission respects the TX_OFF signal state and reschedules any pending transmissions. When overlapped frequencies are being used, the network interface 124 respects the collaboration signal 149, but there are alternatives to consider:

(1) The Uplink Retransmission field may be used since there will be no spare time to transport WiFi packets otherwise.

(2) Because the WiFi receiver is affected during these periods, the network interface 124 should delay any transmission events until the interval is over.

If a transmit packet scheduled by the network interface 124 has been aborted more than 2 times because of the collaboration signal, on the next scheduled transmit time, the TX_OFF signal may be ignored. In addition, If a transmitted packet has failed to be ACK'ed after 2 retries, the collaboration signal may be ignored.

Figure 7:
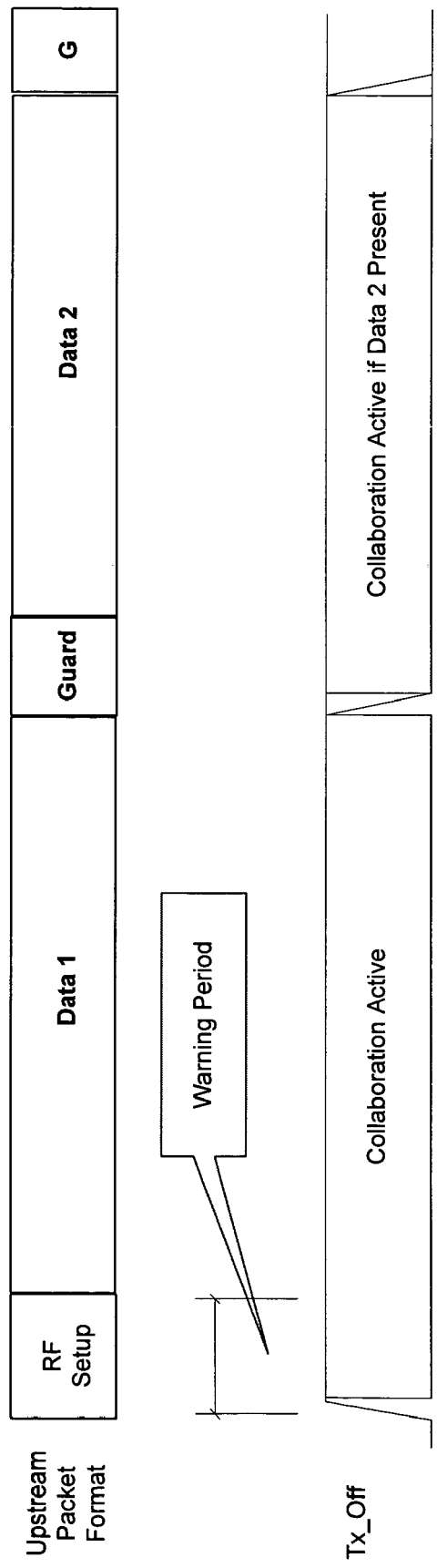
FIG. 7 illustrates timing information of an uplink receive slot for the wireless accessory.

FIG. 7 shows a more detailed timing information of an uplink receive slot for wireless accessories 154. It also indicates the corresponding state of the collaboration signal 149. The collaboration signal should be asserted as soon as possible at the beginning of the packet. This means the signal should be active at the start of the RF Setup field even though the receiver will not be demodulating information during this period. This is intended to provide advance warning to the WiFi radio in the network interface 124 so it can decide what action to initiate. The WiFi module will expect to have a warning period that is an interval of time where it can continue use of the spectrum.

As indicated in FIG. 7, if the Data 2 slot is not in use, the collaboration signal is de-asserted at the end of the Data 1 field. It will not activate again until the next active wireless accessory timeslot is reached. If both the Data 1 and Data 2 slots are being used, the collaboration signal will not de-assert during the intervening Guard field, but remain active until the end of the complete packet. If the subsequent timeslot is going to be used, the collaboration signal will not de-assert during the Guard period at the end of the Data 2 field. If only a Data 2 slot is used and not a wireless accessory Data 1 slot, the collaboration signal will be asserted for the warning period before the start of the Data 2 Field.

Figure 8:
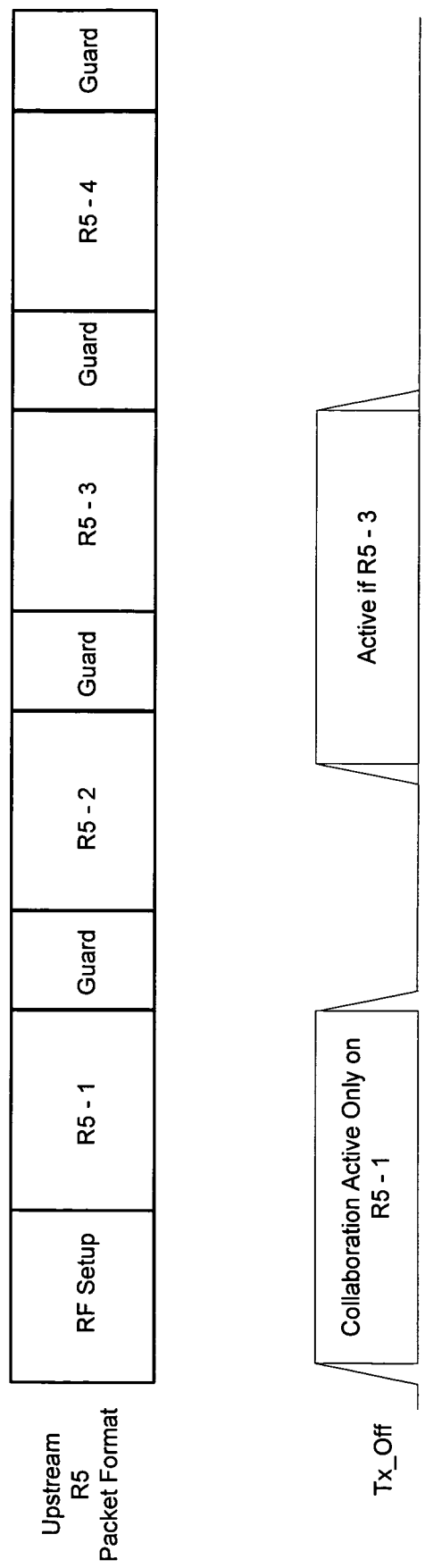
FIG. 8 illustrates timing information for another uplink receive timeslot.
Figure 9:
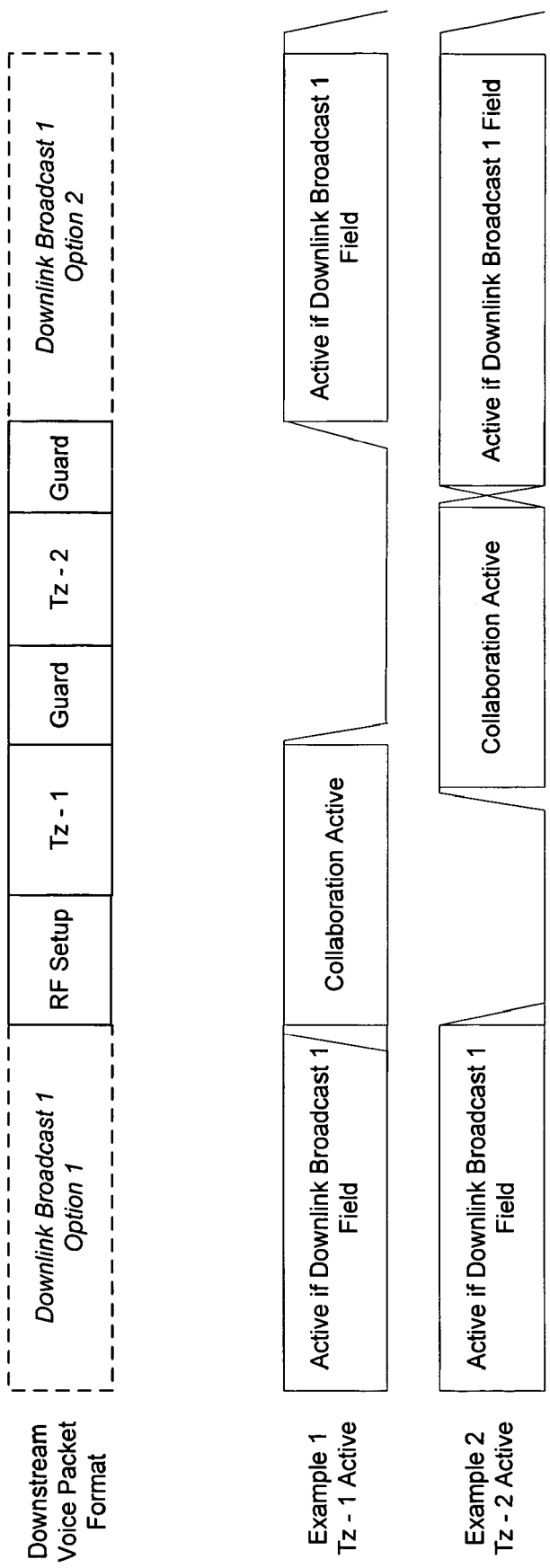
FIG. 9 illustrates downlink data timeslots.

The detailed timing information for the Uplink R5 timeslot is shown in FIG. 8. As with the wireless accessory timeslot periods, the collaboration signal provides the warning period to the WiFi radio. This will occur for each wireless accessory field of the Upstream R5 Packets regardless of timeslot location. At the end of the individual fields (R5-1 to R5-4), the collaboration signal will return in the inactive state. If the adjacent wireless accessory field is going to be utilized, the collaboration signal will remain asserted during the intervening Guard period. If the wireless adapter radio has not detected an incoming transmission, the collaboration signal will be de-asserted.

To aid in the avoidance of overlapping spectrum usage problems between the WiFi radio and the wireless adapter radio, the WiFi RF channel information is provided to the wireless adapter radio. This information is used by the Adaptive Frequency Hopping (AFH) Algorithm of the wireless adapter radio to avoid using any of the WiFi spectrum. However, because the WiFi channels use 20 MHz of bandwidth, the wireless adapter channel use 2 MHz of bandwidth, and there is only 80 MHz of total spectrum, there are times there may not be sufficient spectrum for the AFH algorithm to conform to regulatory requirements. This can occur if there are other interference sources present in the environment. In these situations, it can be better for the wireless adapter radio to use the WiFi spectrum If this is the case, then the wireless adapter and WiFi radios cannot both transmit on the overlapping spectrum at the same time period.

To prevent this type of collision of the two RF transmitters, the wireless adapter radio asserts the collaboration signal whenever overlapping spectrum is being used and the wireless adapter radio is transmitting or receiving. This means the collaboration signal will be active during the Downlink Broadcast 1 and the Downlink Broadcast 2 timeslots. The collaboration signal is active for the warning period before turning on the transmitter in the wireless adapter and remains active until the wireless adapter's transmission has completed.

If the Downlink T1 and T2 timeslots are active under this situation, the collaboration signal must also be asserted during the respective Voice timeslots. This is shown in FIG. 8. There are two Downstream Tz fields, one on either side of the Downlink Broadcast 1 field. The first one contains the data packets from wireless accessory 1 and 2. The second field holds the data packets from wireless accessory 3 and 4. How the collaboration signal reacts is dependant upon which Downstream Tz field is being used. If only a single wireless accessory data field is active in a Downstream Tz field then the collaboration signal is asserted for the warning period before the beginning of the data packet and remains active for its duration.

If the active data field is adjacent to the Downlink Broadcast field, the collaboration signal remains active until either the data packet has completed or the Downlink Broadcast field has completed. If both data fields are active then the collaboration signal is asserted through the entire Downstream Tz field and the Downlink Broadcast field. If three or more data fields are active and three or more wireless accessory data receive fields are active then the collaboration signal will be asserted for at the beginning of the first wireless accessory Data field in use and remain active until the last data field in the second Downlink Data field. The collaboration signal will not assert during the Uplink R5 fields regardless of their state. This is done to permit some amount of bandwidth to the WiFi radio during these situations.

An exemplary hardware implementation of the collaboration design consists of a single logic signal (Tx_Off). The signal originates on the wireless adapter radio and terminated on the WiFi module. Whenever the wireless adapter module wants to suspend the WiFi module's transmissions, it sets the Tx_Off signal to a logic HIGH. When the wireless adapter module has completed its activities, it will de-assert Tx_Off to logic LOW.

Associated with the hardware collaboration signal there is also a messaging communication channel between the wireless adapter radio and the WiFi radio. The purpose of this channel is to provide configuration information to both sides of the link. This is done to permit intelligent decision making on the two different radio protocols and make more efficient use of the shared spectrum. Messaging is performed over USB interfaces associated with the USB controllers 126 and 128. The wireless adapter driver in the console 100 will exchange the appropriate messages at the correct time through the WiFi driver.

The messages and the information elements each message contains, and the messages that are sent from the WiFi radio to the wireless adapter radio will now be described. This latter type of messages contains the active WiFi channel in use. The channel selection is performed by the Access Point 156 of the WiFi network selecting an appropriate channel to use. The WiFi radio scans the different channels and attaches to the correct network. The following parameters are used to indicate which RF channel in the 2.4 GHz ISM band is active.

TABLE 2

WiFi Channel Parameter List

| Channel_number | RF Frequency |
| --- | --- |
| 00 | none |
| 01 | 2412 MHz |
| 02 | 2417 MHz |
| 03 | 2422 MHz |
| 04 | 2427 MHz |
| 05 | 2432 MHz |
| 06 | 2437 MHz |
| 07 | 2442 MHz |
| 08 | 2447 MHz |
| 09 | 2452 MHz |
| 10 | 2457 MHz |
| 11 | 2462 MHz |
| 12 | 2467 MHz |
| 13 | 2472 MHz |
| 14 | 2484 MHz |

If no active RF channel is being used or if the channel is not in the 2.4 GHz band, the channel_number=0 will be used. Since the WiFi channel can change during normal operation of the WiFi network, the wireless adapter driver updates the wireless adapter radio upon this event.

Collaboration Start/Stop Message. This message is used to enable or disable the collaboration signal. When the message indicates stop, the collaboration signal returns to a de-asserted state and remain in that state until it is re-enabled by the start message.

R5 Start/Stop Message. This message is used to enable or disable the collaboration signal during the Uplink R5 time slot. Since the duty cycle of this timeslot is expected to be small, it may be better to simply disable the collaboration signal from being asserted during this interval. When the message indicates stop, the collaboration signal will not be asserted during the Uplink R5 slot. Otherwise, it will function as normal This section outlines the messages which are sent from the wireless adapter radio to the WiFi radio.

WiFi_Channel Message. This message contains the active WiFi channel in which the wireless adapter radio believes to be in use. It uses the same parameters as listed in Table 2. This message is only intended for debug purposes.

Wireless accessory Configuration Message. This message provides information on the type of active connections which exist on the wireless adapter radio link and which fields are being used. This is used by the WiFi collaboration logic to determine appropriate decisions. It also includes the length of various fields This is provided for future compatibility if the field definitions ever change in size. This message only needs to be sent to the WiFi radio at initialization time and whenever any of the fields change state.

While the present invention has been described in connection with the preferred embodiments of the various FIGS., it is to be understood that other similar embodiments may be used or modifications and additions may be made to the described embodiment for performing the same function of the present invention without deviating therefrom.

What is claimed is:

1. A method of collaboration between a WiFi radio and a Adaptive Frequency Hopping (AFH) radio that share frequency spectrum, comprising:
   providing a signaling path between said WiFi radio and said AFH radio;
   providing, over the signaling path, first information to said WiFi radio about frequency spectrum use by said AFH radio;
   providing, over the signaling path, second information to said AFH radio about a channel in use by said WiFi radio;
   asserting a collaboration signal along said signaling path when said AFH radio communicates with a wireless accessory, said collaboration signal containing a warning period of approximately 30 microseconds to approximately 500 microseconds and configured to allow said WiFi radio to use at least a portion of the spectrum of the AFH radio and sharable by the WiFi radio for a predetermined amount of time;
   completing transmission, if any, by said WiFi radio within the warning period and over the at least a portion of the frequency spectrum of the AFH radio; and
   aborting transmissions of said WiFi radio.

2. The method of claim 1, said asserting said collaboration signal occurring at a predetermined period of time before said WiFi radio is to abort transmissions.

3. The method of claim 1, said asserting said collaboration signal being performed in accordance timeslots within a protocol of said AFH radio.

4. The method of claim 1, further comprising:
   determining, at said WiFi radio, whether to transmit a next packet of information based on receipt of said collaboration signal.

5. The method of claim 1, further comprising:
   determining available time window sizes and a transmit bit rate;
   determining a size of a next packet in accordance with said transmit bit rate; and transporting said next packet from said WiFi radio.

6. The method of claim 1, further comprising deferring a transmit time of said WiFi radio to a time slot which does not overlap.

7. The method of claim 1, further comprising maintaining CWmin at a constant value upon a transmission failure due to an assertion of said collaboration signal.

* * * * *